US012722337B2

(12) United States Patent
Richardson

(10) Patent No.: US 12,722,337 B2
(45) Date of Patent: Sep. 1, 2026

(54) SUPERPLASTIC FORMING MACHINE AND A METHOD OF SUPERPLASTIC FORMING

(71) Applicant: Barry Richardson, West Yorkshire (GB)

(72) Inventor: Barry Richardson, West Yorkshire (GB)

( * ) Notice: Subject to any disclaimer, the term of this patent is extended or adjusted under 35 U.S.C. 154(b) by 64 days.

(21) Appl. No.: 18/770,158

(22) Filed: Jul. 11, 2024

(65) Prior Publication Data

US 2025/0018637 A1 Jan. 16, 2025

(30) Foreign Application Priority Data

Jul. 11, 2023 (GB) ...................................... 2310622

(51) Int. Cl.
*B30B 15/28* (2006.01)
*B29C 49/28* (2006.01)
*B29C 49/56* (2006.01)

(52) U.S. Cl.
CPC ........ *B29C 49/56* (2013.01); *B29C 49/28006* (2022.05); *B30B 15/287* (2013.01); *B29C 2049/5661* (2022.05)

(58) Field of Classification Search
CPC ....... B30B 15/287; B30B 1/323; B29C 49/56; B29C 49/28006; B29C 2049/5661; B21D 26/031; B21D 26/025; B21D 26/055; B21D 37/14
See application file for complete search history.

(56) References Cited

U.S. PATENT DOCUMENTS 9,283,609 B2 3/2016 Huang
2015/0101499 A1* 4/2015 Hitchcock ............ B30B 9/3032 100/229 A

FOREIGN PATENT DOCUMENTS

| | | | | |
|---|---|---|---|---|
| CN | 202623323 U | * 12/2012 | | B30B 15/287 |
| CN | 202640825 U | * 1/2013 | | B30B 15/287 |
| DE | 19608486 C1 | * 7/1997 | | B30B 1/323 |
| DE | 19729384 A1 | * 1/1999 | | B21D 26/039 |
| DE | 19955519 B4 | 3/2005 | | |
| EP | 1075882 A2 | * 2/2001 | | B21D 22/205 |

(Continued)

OTHER PUBLICATIONS

English translation of DE 19729384 A1, 5 pages (Year: 2026).*

(Continued)

*Primary Examiner* — Jimmy T Nguyen
(74) *Attorney, Agent, or Firm* — Michael J Porco; Gerald E Hespos

(57) ABSTRACT

A superplastic forming machine including first and second parallel spaced apart platens, each arranged in a plane normal to a displacement axis; a first displacement mechanism connected to the first platen and configured to displace the first platen along the displacement axis; a locking mechanism which can be configured in a locked configuration in which the first locking mechanism prevents displacement of the first platen along the displacement axis and an unlocked configuration in which the locking mechanism does not prevent displacement of the first platen along the displacement axis; and, a second displacement mechanism connected to the second platen and configured to displace the second platen along the displacement axis towards the first platen the second displacement mechanism being a self-locking displacement mechanism.

11 Claims, 7 Drawing Sheets

(56) References Cited

FOREIGN PATENT DOCUMENTS

| | | |
|---|---|---|
| EP | 1256396 A1 | 11/2002 |
| GB | 1231428 | 5/1971 |

OTHER PUBLICATIONS

English translation of EP-1075882 A2, 5 pages (Year: 2026).*
Englsih translation for JP-H09141500 A, 5 pages (Year: 2026).*
EP Search Report and Written Opinion for EP Application No. 24186535.1 dated Nov. 15, 2024; ten (10) pages.
English machine translation of DE19955519B4, obtained from the European Patent office website www.epo.org on Nov. 21, 2024.
English machine translation of EP1256396A1, obtained from the European Patent office website www.epo.org on Nov. 21, 2024.
UK Search Report for Application No. GB2310622.2; dated Jan. 4, 2024; three (3) pages.

* cited by examiner

SUPERPLASTIC FORMING MACHINE AND A METHOD OF SUPERPLASTIC FORMING

BACKGROUND

(1) Field of the Invention

The present invention relates to a method of superplastic forming. More particularly, but not exclusively, the present invention relates to a superplastic forming machine comprising first and second platens, a first displacement mechanisms configured to displace the first platen along a displacement axis, a second displacement mechanism configured to displace the second platen along the displacement axis towards the first platen, the second displacement mechanism being a self-locking displacement mechanism, and, a locking mechanism which prevents displacement of the first platen along the displacement axis when in a locking configuration. The present invention also relates to a method of superplastic forming. More particularly, but not exclusively, the present invention relates to a method of superplastic forming comprising the steps of providing a superplastic forming machine according to the invention, arranging a mould containing a material to be formed between the first and second platens, pressing the mould closed, heating the mould and then providing a gas to the mould to form the material in the mould.

Description of the Related Art

Superplastic forming machines are known. Such machines typically comprise first and second platens, one fixed and one moving, which press two halves of a mould together. In use a component blank is placed within the mould cavity and heated to a predetermined temperature. Once the temperature is reached a pressurised gas is used to blow form the component blank into the internal cavity of the mould to form a component. As the gas pressure increases to form the component the mould tends to open and accordingly an external force is applied to the platens to keep the mould closed and prevent material leakage. This varying external force is sustained throughout the forming process and is typically provided by servo-controlled hydraulic cylinders.

GB1231428 discloses an example of an apparatus for forming metal alloys. The apparatus comprises hydraulic cylinders for displacing platens. The hydraulic cylinders are controlled by a hydraulic control system.

The use of hydraulic cylinders enables fine control over the positions of the platens. However, such systems are complex and expensive devices. This limits the use of such machines, typically to the high value aerospace and aeronautical sectors. Further, the use of hydraulic fluid close to hot metal is a significant fire hazard.

The present invention seeks to overcome the problems of the prior art.

BRIEF SUMMARY OF THE INVENTION

Accordingly, the present invention provides a superplastic forming machine comprising

- first and second parallel spaced apart platens, each arranged in a plane normal to a displacement axis;
- a first displacement mechanism connected to the first platen and configured to displace the first platen along the displacement axis;

- a locking mechanism which can be configured in a locked configuration in which the locking mechanism prevents displacement of the first platen along the displacement axis and an unlocked configuration in which the locking mechanism does not prevent displacement of the first platen along the displacement axis;

and,

- a second displacement mechanism connected to the second platen and configured to displace the second platen along the displacement axis towards the first platen, the second displacement mechanism being a self-locking displacement mechanism.

The superplastic forming machine according to the invention provides fine control over the platens. Further, the superplastic forming machine according to the invention is simple and less expensive to manufacture and use than known superplastic forming machines. Further, no hydraulic fluid is required.

The superplastic forming machine according to the invention employs simple locking and displacement mechanisms. The superplastic forming machine according to the invention is simpler and less expensive to manufacture and operate than known superplastic forming machines.

Preferably the superplastic forming machine further comprises a frame.

Preferably the locking mechanism is configured to lock the first platen to the frame when the locking mechanism is in the locking configuration.

Preferably the locking mechanism comprises a chock and a chock displacement mechanism, the chock displacement mechanism being arranged on the first platen and being connected to the chock;

- the frame comprising a plurality of spaced apart recesses, the recesses being arranged such that as the first platen is displaced along the displacement axis the chock aligns with each recess in turn;
- wherein when the locking mechanism is in the locked configuration the chock is received in a recess and when the locking mechanism is in the unlocked configuration the chock is spaced apart from the recess.

Preferably the chock displacement mechanism is a mechanical or electromechanical displacement mechanism.

Preferably the first displacement mechanism comprises a mechanical or electromechanical displacement mechanism.

Preferably the first displacement mechanism comprises at least one of a screw jack and an electrical drive system, a screw jack and a mechanical drive system, a sprocket and chain mechanism and a rack and pinion mechanism.

Preferably the first displacement mechanism is connected to the frame.

Preferably the second displacement mechanism comprises a mechanical or electromechanical displacement mechanism.

Preferably the second displacement mechanism comprises at least one of a screw jack and an electrical drive system, a screw jack and a mechanical drive system, a sprocket and chain mechanism and a rack and pinion mechanism.

Preferably the second displacement mechanism is connected to the frame.

Preferably the superplastic forming machine further comprises a mould between the first and second platens.

Preferably the superplastic forming machine further comprises a gas source connected to the mould.

In a further aspect of the invention there is provided a method of superplastic forming comprising the steps of (a) providing a superplastic forming machine as claimed in any one of claims 1 to 3;
(b) arranging a mould containing a material to be formed between the first and second platens;
(c) configuring the locking mechanism in the locked configuration so locking the first platen in place;
(d) displacing the second platen along the displacement axis by means of the second displacement mechanism to press the mould closed;
(e) heating the mould; and
(f) providing a gas to the mould to form the material in the mould.

BRIEF DESCRIPTION OF THE SEVERAL VIEWS OF THE DRAWINGS

The present invention will now be described by way of example only and not in any limitative sense with reference to the accompanying drawings in which.

DETAILED DESCRIPTION OF THE INVENTION

Figure 1:
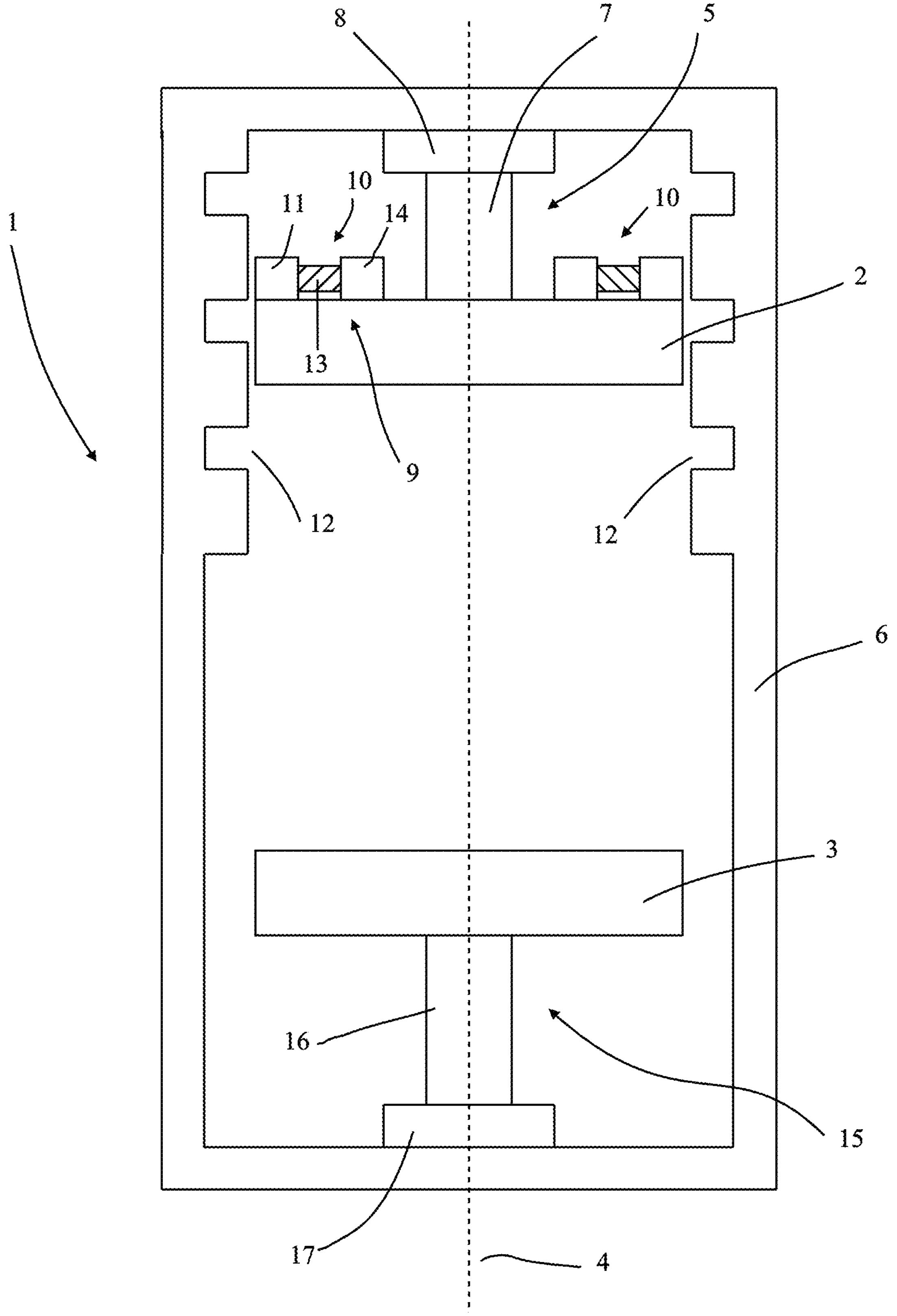
FIG. 1 shows a first embodiment of a superplastic forming machine according to the invention in vertical cross section.

Shown in FIG. 1 in vertical cross section is a first embodiment of a superplastic forming machine 1 according to the invention in vertical cross section. The superplastic forming machine 1 comprises first and second parallel spaced apart platens 2, 3, each of which is arranged in a plane normal to a displacement axis 4 as shown. Each of the first and second platens 2, 3 comprises a heating element so that the platens 2, 3 can be heated in use.

The superplastic forming machine 1 further comprises a first displacement mechanism 5 connected to the first platen 2 and a frame 6. The first displacement mechanism 5 is configured to displace the first platen 2 along the displacement axis 4 towards and away from the second platen 3. In this embodiment the first displacement mechanism 5 comprises a combination of screw jack 7 and electrical drive system 8. In alternative embodiments other types of mechanical or electromechanical first displacement mechanism 5 are possible. The first displacement mechanism 5 can for example comprise at least one of a screw jack and mechanical drive system, a sprocket and chain mechanism, and a rack and pinion mechanism.

The superplastic forming machine 1 further comprises a locking mechanism 9. The locking mechanism 9 can be configured in locked and unlocked configurations. In the locked configuration the locking mechanism 9 prevents displacement of the first platen 2 along the displacement axis 4. In the unlocked configuration the locking mechanism 9 does not prevent displacement of the first platen 2 along the displacement axis 4.

Figure 2A:
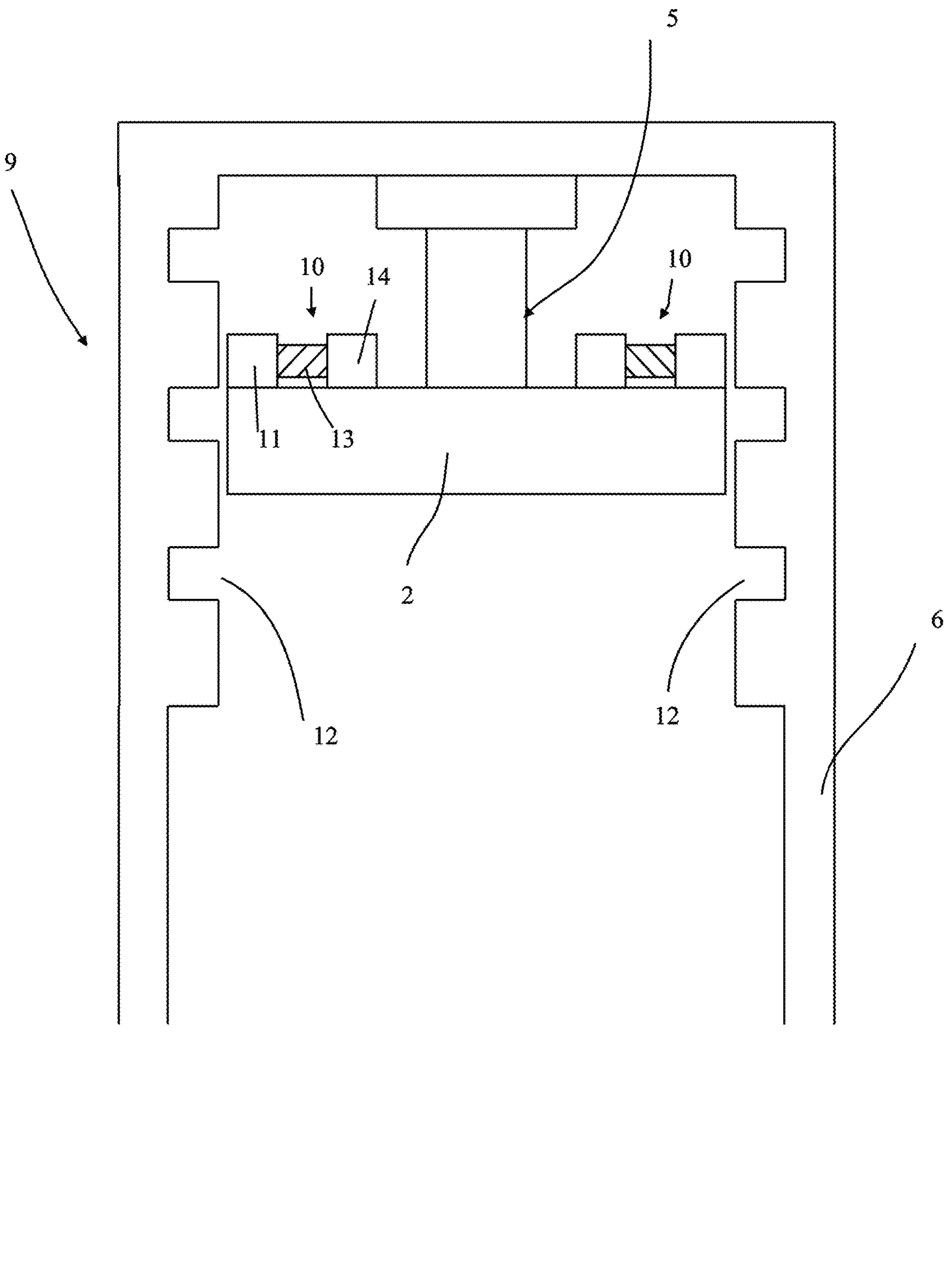
FIGS. 2(*a*) and 2(*b*) show the first locking mechanism of the superplastic forming machine of FIG. 1 in unlocked and locked configurations; and, FIGS. 3(*a*) to 3(*d*) show, in schematic form, a method of superplastic forming according to the invention.
Figure 2B:
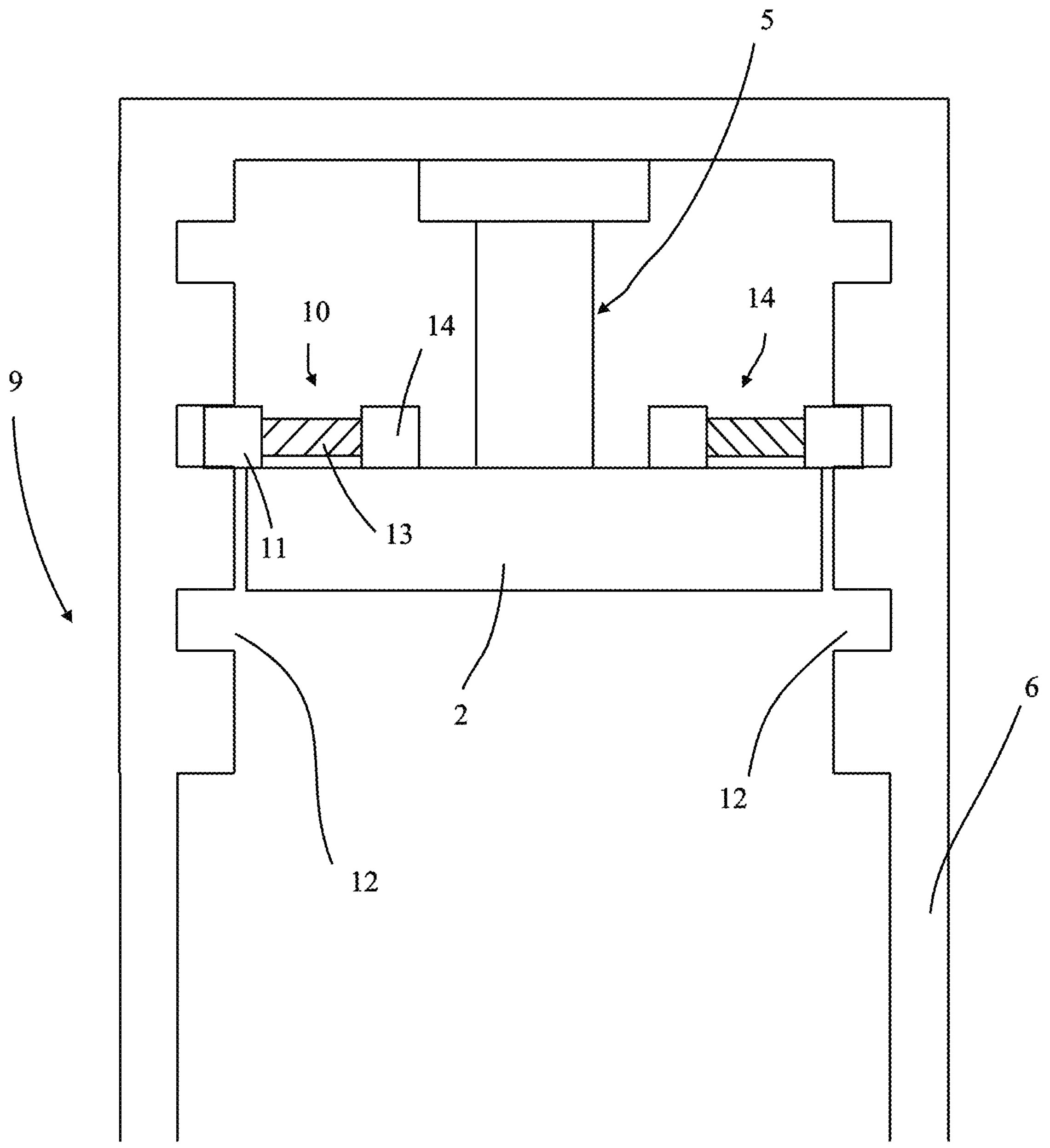
Figure 3A:
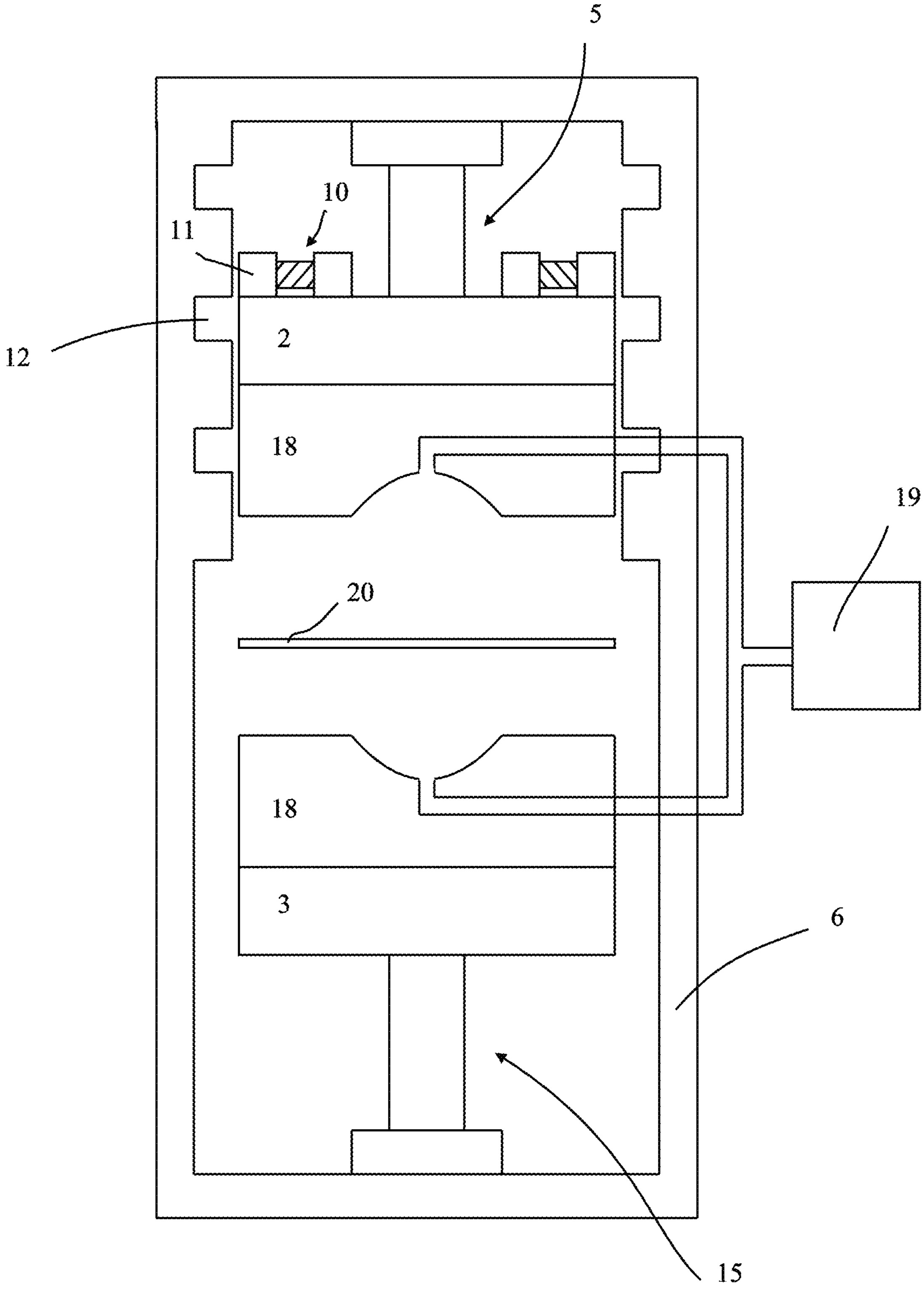
Figure 3B:
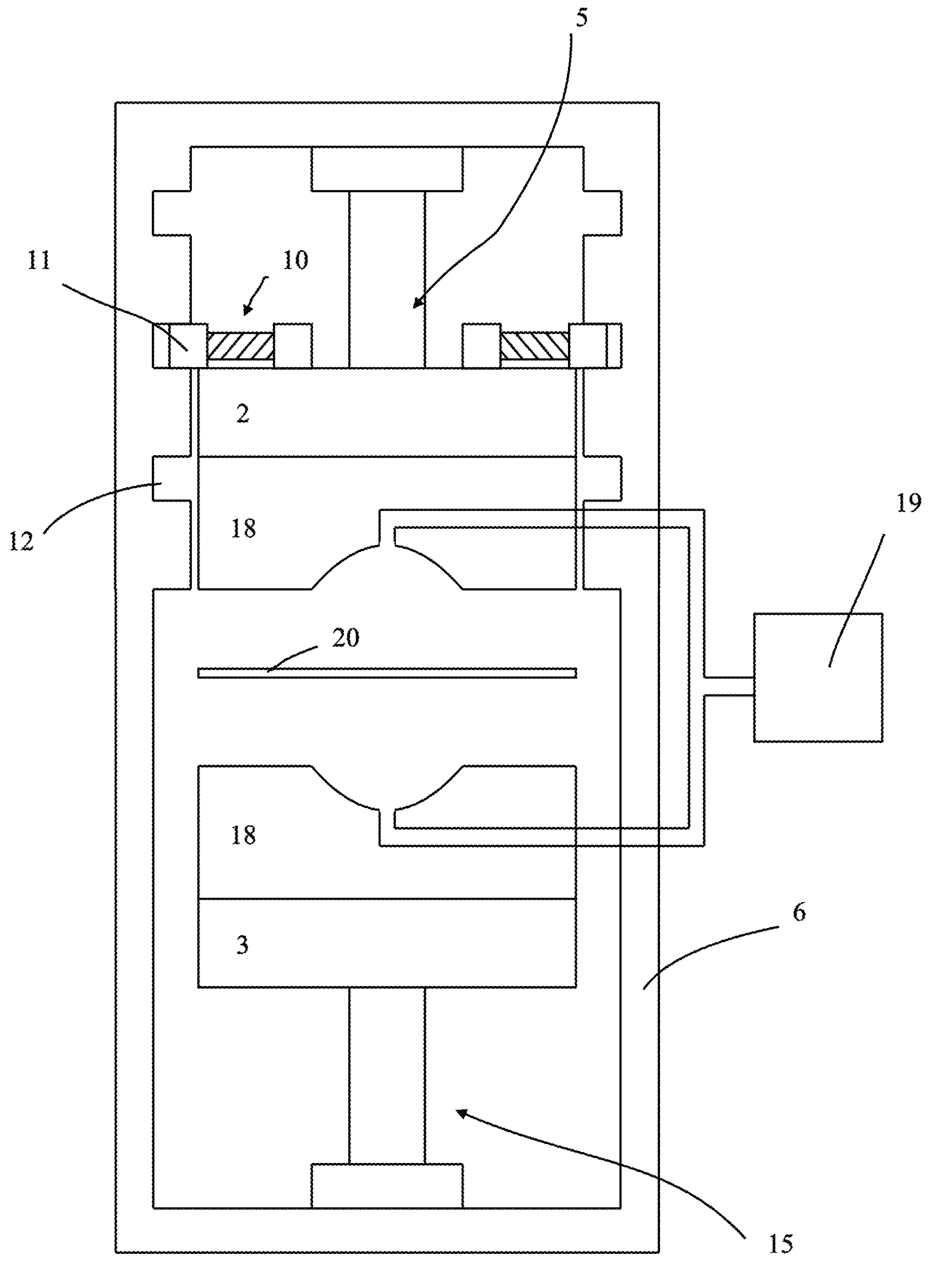
Figure 3C:
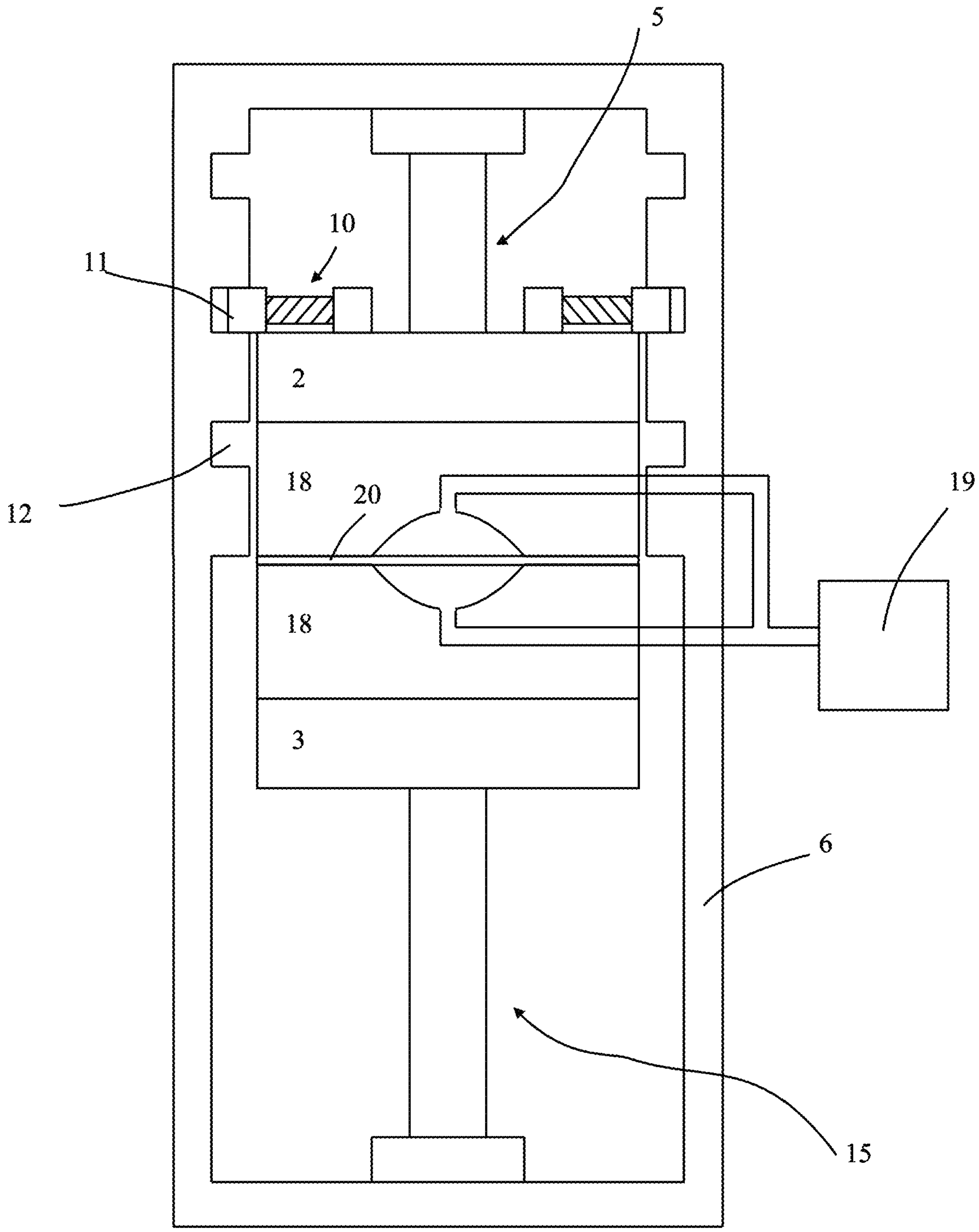
Figure 3D:
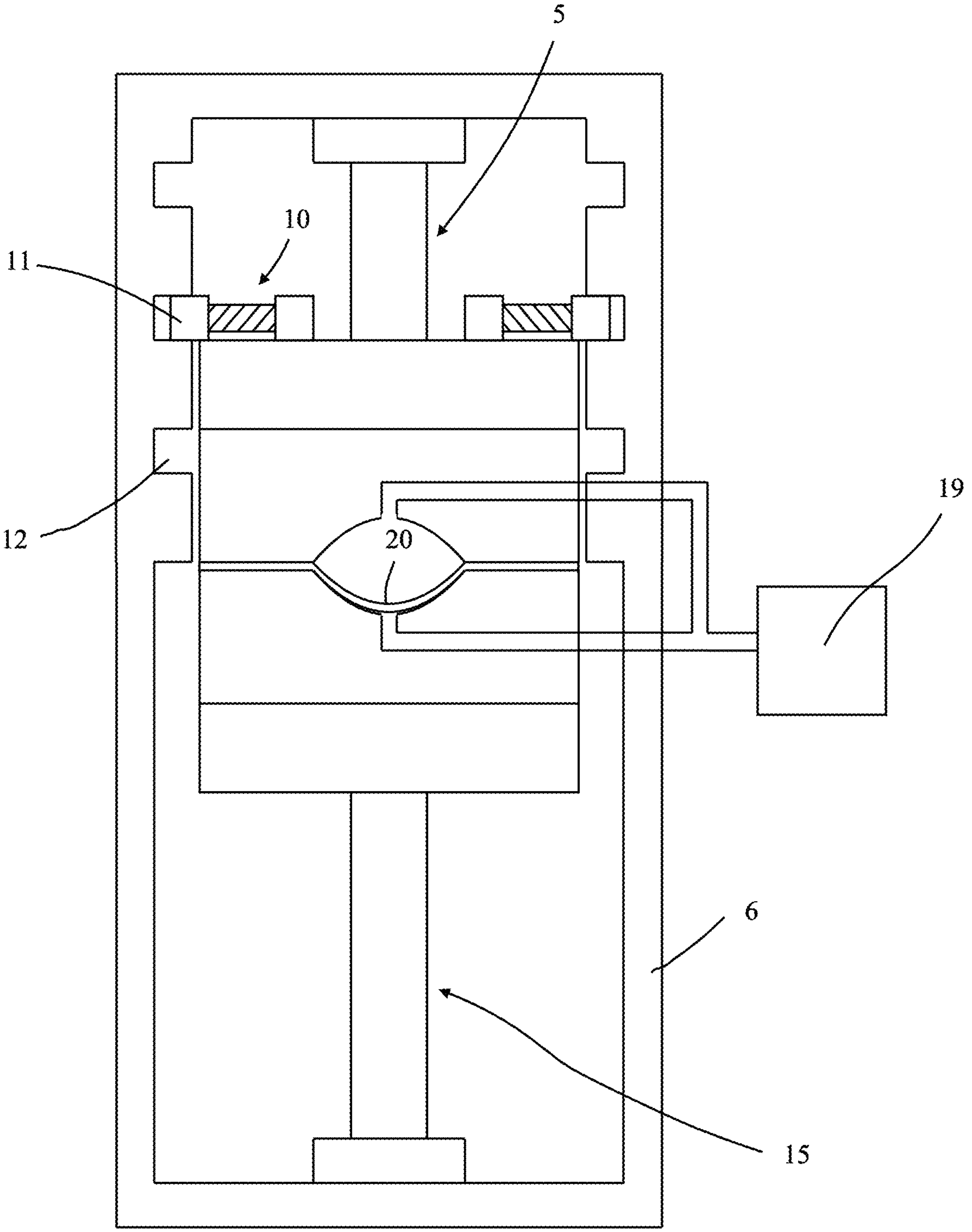

The operation of the locking mechanism 9 is shown in more detail in FIGS. 2(*a*) and 2(*b*) which show the locking mechanism 9 in unlocked and locked configurations respectively. With reference to FIG. 2(*a*) the locking mechanism 9 comprises a chock displacement mechanism 10 arranged on the first platen 2 and a chock 11 connected to the chock displacement mechanism 10. The chock displacement mechanism 10 is configured to displace the chock 11 with respect to the first platen 2.

As shown in FIG. 1 and in enlarged view in FIG. 2(*a*) the frame 6 comprises a plurality of spaced apart recesses 12. The spaced apart recesses 12 are arranged such that as the first platen 2 moves along the displacement axis 4 the chock 11 aligns with each recess 12 in turn.

In FIG. 2(*a*) the locking mechanism 9 is in the unlocked configuration. In this configuration the chock 11 is spaced apart from the recesses 12 as shown, so allowing the first platen 2 to move freely along the displacement axis 4.

In FIG. 2(*b*) the locking mechanism 9 is shown in the locked configuration. To change from the unlocked configuration to the locked configuration the first platen 2 is moved along the displacement axis 4 until the chock 11 aligns with a recess 12. The chock displacement mechanism 10 then displaces the chock 11 beyond the outer edge of the first platen 2 and into the recess 12 as shown. In order to change back to the unlocked configuration, the chock displacement mechanism 10 retracts the chock 11 so that it is no longer received within the recess 12.

In this embodiment the chock displacement mechanism 10 comprises a screw 13 connected to an electrical drive system 14. In alternative embodiments of the invention the chock displacement mechanism 10 can comprise other types of mechanical or electromechanical displacement mechanism. The chock displacement mechanism 10 can for example comprise at least one of a screw and mechanical drive system, a sprocket and chain mechanism and a rack and pinion mechanism.

Returning to FIG. 1, the superplastic forming machine 1 according to the invention further comprises a second displacement mechanism 15 connected to the second platen 3 and configured to displace the second platen 3 towards and away from the first platen 2 along the displacement axis 4. The second displacement mechanism 15 is a self-locking mechanism. Self-locking displacement mechanisms are known in the field of mechanical and electromechanical engineering. The self-locking second displacement mechanism 15 is configured to displace the second platen 3 towards and away from the first platen 2. The self-locking second displacement mechanism 15 however resists the urging of the second platen 3 away from the first platen 2 along the displacement axis 4 by an external force.

In this embodiment the second displacement mechanism 15 comprises a screw jack 16 and an electrical drive system 17. In alternative embodiments of the invention other types of mechanical or electromechanical second displacement mechanism 15 are possible. In alternative embodiments of the invention the second displacement mechanism 15 comprises at least one of a screw jack and mechanical drive system, a sprocket and chain mechanism and a rack and pinion mechanism. In this embodiment the second displacement mechanism 15 is connected to the frame 6.

In use a two-part mould 18 connected to a gas source 19 is introduced between the first and second platens 2, 3 as shown in FIG. 3(*a*). The two-part mould 18 contains a material 20 to be formed. The upper part of the mould 18 is attached to the first platen 2 and the lower part of the mould 18 is connected to the second platen 3. The first displacement mechanism 15 then displaces the first platen 2 along the displacement axis 4 towards the second platen 3 until the chock 11 of the locking mechanism 9 is aligned with the appropriate recess 12 of the frame 6. The chock displacement mechanism 10 then displaces the chock 11 so that it is received by the recess 12 so locking the first platen 2 in place as shown in FIG. 3(*b*).

Once the first platen 2 is locked in position the second displacement mechanism 15 then displaces the second platen 3 towards the first platen 2 until the mould 18 is closed as shown in FIG. 3(*c*). Preferably the second platen 3 applies a force to the mould 18 to ensure it is fully closed.

The first and second platens 2, 3 are then heated. Once they have reached the desired temperature gas is introduced into the mould 18 from a gas source 19 so superplastic forming the material 20 into the shape of an article as shown in FIG. 3(*d*). As the gas is introduced into the mould 18 it provides an opening force which urges the two halves of the mould 18 apart. The locking mechanism 9 however maintains the first platen 2 in position. The self-locking nature of the second displacement mechanism 15 maintains the second platen 3 in place and accordingly the mould 18 remains closed. The varying mould opening force generated as the gas pressure increases is resisted by the stiffness of the frame 6.

Once forming is complete the second displacement mechanism 15 displaces the second platen 3 away from the first platen 2, so opening the mould 18 and allowing the removal of the formed article.

The superplastic forming machine 1 according to the invention has a number of advantages. No closed loop control system is required to control the closing force on the mould 18. The machine 1 is therefore relatively simple and inexpensive to manufacture. Secondly, the first displacement mechanism 5 need only have the capacity to support and displace the first platen 2 and top part of the two part mould 18. Once the first platen 2 is locked in position it is the locking mechanism 9 and frame 6 which withstands the opening force of the mould 18 generated because of the increase of the gas pressure inside the mould 18. Further, the use of hydraulic fluid is not required. If hydraulic fluid is used close to hot platens there is a risk of fire. Further, once the first and second displacement mechanisms 5, 15 have moved the first and second platens 2, 3 into position to close the mould 18 between them, then the first and second displacement mechanisms 5, 15 do not require further power during the forming process to keep the mould 18 closed. This significantly reduces operating cost.

The superplastic forming machine 1 according to the invention is also suitable for other applications, in particular diffusion bonding and hot and incremental forming, and also blow moulding of composites

The invention claimed is:

1. A superplastic forming machine comprising:

a frame;

first and second parallel spaced apart platens, each arranged in a plane normal to a displacement axis;

a first displacement mechanism connected to the first platen and configured to displace the first platen along the displacement axis;

a locking mechanism which can be configured in a locked configuration in which the locking mechanism prevents displacement of the first platen along the displacement axis and an unlocked configuration in which the locking mechanism does not prevent displacement of the first platen along the displacement axis, the locking mechanism is configured to lock the first platen to the frame when the locking mechanism is in the locking configuration;

the locking mechanism comprises a chock and a chock displacement mechanism, the chock displacement mechanism being arranged on the first platen and being connected to the chock;

a second displacement mechanism connected to the second platen and configured to displace the second platen along the displacement axis towards the first platen the second displacement mechanism being a self-locking displacement mechanism; and at least one vertical side of the frame comprising a plurality of spaced apart recesses, the recesses being arranged such that as the first platen is displaced along the displacement axis the chock aligns with each recess of the plurality of spaced apart recesses in turn, wherein when the locking mechanism is in the locked configuration the chock is received in a recess of the plurality of spaced apart recesses and when the locking mechanism is in the unlocked configuration the chock is spaced apart from the recess.

2. The superplastic forming machine as claimed in claim 1, wherein the chock displacement mechanism is a mechanical or electromechanical displacement mechanism.

3. The superplastic forming machine as claimed in claim 1, wherein the first displacement mechanism comprises a mechanical or electromechanical displacement mechanism.

4. The superplastic forming machine as claimed in claim 3, wherein the first displacement mechanism comprises at least one of a screw jack and electrical drive system, a screw jack and mechanical drive system, a sprocket and chain mechanism and a rack and pinion mechanism.

5. The superplastic forming machine as claimed in claim 1, wherein the first displacement mechanism is connected to the frame.

6. The superplastic forming machine as claimed in claim 1, wherein the second displacement mechanism comprises a mechanical or electromechanical displacement mechanism.

7. The superplastic forming machine as claimed in claim 6, wherein the second displacement mechanism comprises at least one of a screw jack and an electrical drive system, a screw jack and a mechanical drive system, a sprocket and chain mechanism and a rack and pinion mechanism.

8. The superplastic forming machine as claimed in claim 1, wherein the second displacement mechanism is connected to the frame.

9. The superplastic forming machine as claimed in claim 1, further comprising a mould between the first and second platens.

10. The superplastic forming machine as claimed in claim 9, further comprising a gas source connected to the mould.

11. A method of superplastic forming comprising the steps of:

a) providing a superplastic forming machine comprising:

a frame;

first and second parallel spaced apart platens, each arranged in a plane normal to a displacement axis;

a first displacement mechanism connected to the first platen and configured to displace the first platen along the displacement axis;

a locking mechanism which can be configured in a locked configuration in which the locking mechanism prevents displacement of the first platen along the displacement axis and an unlocked configuration in which the locking mechanism does not prevent displacement of the first platen along the displacement axis, the locking mechanism is configured to lock the first platen to the frame when the locking mechanism is in the locking configuration;

the locking mechanism comprises a chock and a chock displacement mechanism, the chock displacement mechanism being arranged on the first platen and being connected to the chock;

a second displacement mechanism connected to the second platen and configured to displace the second platen along the displacement axis towards the first platen the second displacement mechanism being a self-locking displacement mechanism; and at least one vertical side of the frame comprising a plurality of spaced apart recesses, the recesses being arranged such that as the first platen is displaced along the displacement axis the chock aligns with each recess of the plurality of spaced apart recesses in turn, wherein when the locking mechanism is in the locked configuration the chock is received in a recess of the plurality of spaced apart recesses and when the locking mechanism is in the unlocked configuration the chock is spaced apart from the recess, b) arranging a mould containing a material to be formed between the first and second platens;

c) configuring the locking mechanism in the locked configuration so locking the first platen in place;

d) displacing the second platen along the displacement axis by means of the second displacement mechanism to press the mould closed;

e) heating the mould; and f) providing a gas to the mould to form the material in the mould.

* * * * *